(12) United States Patent
Sawafuji et al.

(10) Patent No.: US 7,117,719 B2
(45) Date of Patent: Oct. 10, 2006

(54) HOLE SHAPE MEASURING METHOD AND APPARATUS

(75) Inventors: Susumu Sawafuji, Mitaka (JP);
Masahiro Tomoeda, Mitaka (JP);
Kazuo Nakajima, Mitaka (JP)

(73) Assignee: Tokyo Seimitsu Co., Ltd., Mitaka (JP)

( * ) Notice: Subject to any disclaimer, the term of this patent is extended or adjusted under 35 U.S.C. 154(b) by 202 days.

(21) Appl. No.: 10/497,665

(22) PCT Filed: Dec. 5, 2001

(86) PCT No.: PCT/JP01/10635

§ 371 (c)(1),
(2), (4) Date: Jun. 4, 2004

(87) PCT Pub. No.: WO03/048683

PCT Pub. Date: Jun. 12, 2003

(65) Prior Publication Data

US 2005/0005715 A1   Jan. 13, 2005

(51) Int. Cl.
*G01B 13/10* (2006.01)
*G01B 13/00* (2006.01)

(52) U.S. Cl. .................. 73/37.9; 73/37.5; 73/37.8
(58) Field of Classification Search ........ 73/37.8–37.9, 73/37.5, 865.8
See application file for complete search history.

(56) References Cited

U.S. PATENT DOCUMENTS 1,919,546 A * 7/1933 Fletcher ................... 73/37.9
2,457,297 A * 12/1948 Aller ..................... 73/37.9 X
2,465,035 A * 3/1949 Polk et al. ................ 73/37.9
2,472,139 A * 6/1949 Emery et al. ............ 73/37.9 X
2,693,037 A * 11/1954 Fox ........................ 73/37.9 X
2,781,661 A * 2/1957 Van Dorn ................ 73/37.9
3,439,526 A * 4/1969 Kaufman ................. 73/37.9
3,667,284 A * 6/1972 Amland et al. ........... 73/37.9
3,751,971 A * 8/1973 Wilcox .................... 73/37.9
3,782,171 A * 1/1974 Watt ....................... 73/37.9
3,792,605 A * 2/1974 Rabenau ................. 73/37.9
4,121,451 A * 10/1978 Radev et al. ............. 73/37.9
4,419,892 A   12/1983 Goolsby et al.
4,856,353 A * 8/1989 Okabe et al. ............ 73/865.8

FOREIGN PATENT DOCUMENTS

| DE | 2700439 A | * | 7/1978 |
| EP | 0 047 032 A2 | | 3/1982 |
| JP | 04324308 A | * | 11/1992 |
| JP | 08014871 A | * | 1/1996 |
| JP | 2001-317928 | | 11/2001 |
| JP | 2001-330422 | | 11/2001 |
| SU | 586321 A | * | 12/1977 |

* cited by examiner

Primary Examiner—Thomas P. Noland
(74) Attorney, Agent, or Firm—David S. Safran

(57) ABSTRACT

In a measuring apparatus 10, an arm 36 is lowered to insert a measuring sphere 30 into a hole 22A in a workpiece 22, and further the measuring sphere 30 is lowered in the depth direction of the hole 22A. Thereby, the back pressure of compressed air is detected at a plurality of locations by an A/E (air/electricity) converter 18. The detected value is compared with the master reference value by a controller 20 to convert the detected value into the inside diameter of the hole 22A. Thereby, the shape of various holes can be measured.

10 Claims, 10 Drawing Sheets

US 7,117,719 B2

HOLE SHAPE MEASURING METHOD AND APPARATUS

TECHNICAL FIELD

The present invention relates to hole shape measuring method and apparatus for measuring the shape of a hole formed in a workpiece.

BACKGROUND ART

An air micrometer is available as one of measuring apparatuses for measuring the shape of a hole. For the conventional air micrometer, a measuring head is inserted into a hole, and compressed air is injected from a nozzle of the measuring head toward the wall surface of hole, by which the back pressure of nozzle is detected. Since the back pressure of nozzle depends on a gap between the inside wall of hole and the nozzle, the detected value can be converted into the inside diameter of the hole by comparing the value with the master reference value having been determined in advance. The conventional air micrometer can determine the shape of a hole by continuously measuring the inside diameter while the measuring head is moved in and out with respect to the hole.

However, for the conventional air micrometer, since the measuring head cannot be moved into or out of a bent or curved hole, the shape of a bent or curved hole cannot be measured.

The present invention has been made in view of the above situation, and accordingly an object thereof is to provide hole shape measuring method and apparatus capable of measuring the shape of various holes.

DISCLOSURE OF THE INVENTION

To achieve the above object, the present invention provides a hole shape measuring method for measuring the inside diameter of a hole at a plurality of locations in the depth direction of the hole to obtain the shape of the hole, comprising the steps of supplying a fluid into the hole; inserting a float into the hole; detecting, at a plurality of locations, at least one of the back pressure and the flow rate at the time when the fluid passes through a gap between the inside wall of the hole and the float and the drag which the float is subjected to while the float is moved in the depth direction of the hole; and comparing the detected value with a reference value to convert the detected value into the inside diameter of the hole.

Also, the present invention provides a hole shape measuring apparatus for measuring the inside diameter of a hole at a plurality of locations in the depth direction of the hole to obtain the shape of the hole, comprising a fluid supply device which supplies a fluid into the hole; a float inserted in the hole; a moving device which moves the float in the depth direction of the hole; a detecting device which detects, at a plurality of locations, at least one of the back pressure and the flow rate at the time when the fluid passes through a gap between the inside wall of the hole and the float and the drag which the float is subjected to; and a converting device which converts the detected value obtained by the detecting device into the inside diameter of the hole by comparing the detected value with a reference value.

According to the present invention, the back pressure or flow rate of the fluid or the drag which the float is subjected to is detected at a plurality of locations while the float is inserted and moved in the hole into which the fluid is supplied, by which the inside diameter of the hole can be measured at a plurality of locations in the depth direction of the hole. Thereby, the shape of a hole having an unfixed diameter, for example, a tapered hole can also be measured.

Also, the present invention provides a hole shape measuring method for measuring the centerline of a hole to obtain the shape of the hole, comprising the steps of supplying a fluid into the hole; inserting a float into the hole; detecting the position of the float at a plurality of locations while the float is moved in the depth direction of the hole; determining the centerline of the hole from the detected value; and obtaining the shape of the hole based on the centerline.

Also, the present invention provides a hole shape measuring apparatus for measuring the centerline of a hole to obtain the shape of the hole, comprising a fluid supply device which supplies a fluid into the hole; a float inserted in the hole; a moving device which moves the float in the depth direction of the hole; and a position detecting device which detects the position of the float at a plurality of locations.

According to the present invention, when the float is inserted into the hole into which the fluid is supplied, the float is subjected to automatic centripetal action and thus is moved to the center of the hole, so that the path of the center of float coincides with the centerline of the hole. Therefore, by detecting the position of the float at a plurality of locations, the centerline of the hole can be determined.

BEST MODE FOR CARRYING OUT THE INVENTION

Embodiments of hole shape measuring method and apparatus in accordance with the present invention will now be described with reference to the accompanying drawings.

Figure 1:
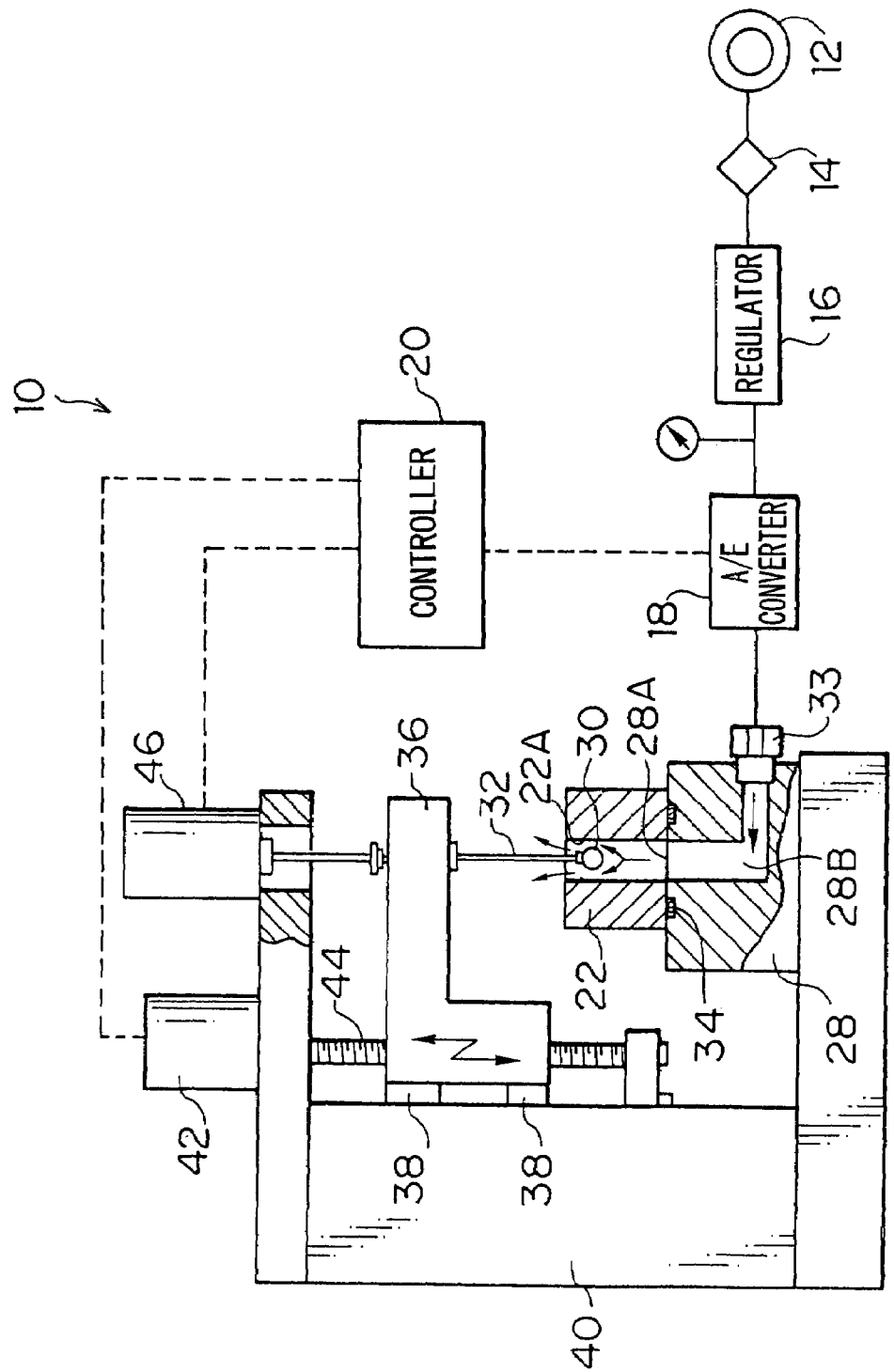
FIG. 1 is a block diagram showing a construction of a first embodiment of a hole shape measuring apparatus in accordance with the present invention.

FIG. 1 is a block diagram showing a construction of a first embodiment of a measuring apparatus 10 in accordance with the present invention. A measuring apparatus 10 is an apparatus which measures the inside diameter of a hole 22A in a workpiece 22 at a plurality of locations in the axial direction of the hole 22A.

As shown in FIG. 1, compressed air supplied from an air source 12 is subjected to dust removal by a filter 14, and is regulated so as to have a fixed pressure by a regulator 16. Thereafter, the compressed air passes through a throttle provided in an A/E converter 18 (air/electricity converter), and is sent to an air feed passage 28B in a measurement bed 28 via a connector 33.

On the top surface of the measurement bed 28, a supply port 28A communicating with the air feed passage 28B is formed, and also the workpiece 22 is placed. The workpiece 22 is formed with the hole 22A, and this hole 22A is caused to communicate with the supply port 28A. Around the supply port 28A, an air leakage preventive seal (O-ring) 34 is disposed, and thereby the leakage of air from a gap between the measurement bed 28 and the workpiece 22 is prevented by the air leakage preventive seal 34. Thus, the compressed air supplied to the air feed passage 28B is injected from the supply port 28A into the hole 22A without leaking.

The compressed air injected into the hole 22A passes through a gap between the inside wall of the hole 22A and a measuring sphere (corresponding to a float) 30, and is blown out to the outside. The A/E converter 18 converts the pressure at this time into an electric signal by means of incorporated bellows and differential transformer, and sends the electric signal to a controller 20. When the diameter of the hole 22A is different, the pressure changes minutely, and, as described later, the controller 20 calculates the inside diameter of the workpiece 22 based on the changed electric signal, and displays the calculated data on a monitor of the controller 20.

Figure 2:
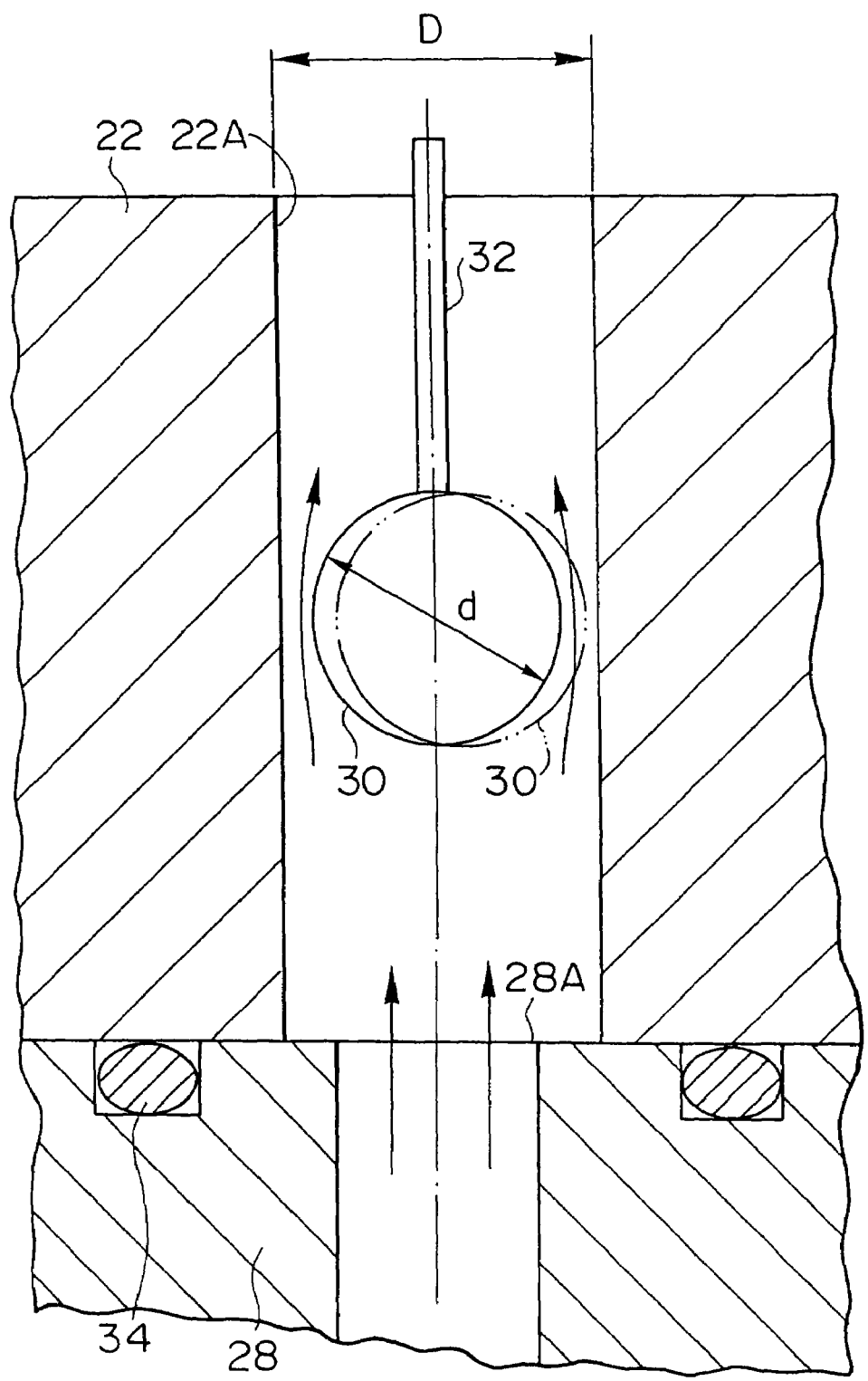
FIG. 2 is a side sectional view showing a characteristic portion of the hole shape measuring apparatus shown in FIG. 1.

The measuring sphere 30 is made by forming a material such as ceramic, resin, steel, and light alloy into a spherical shape with high machining accuracy. As shown in FIG. 2, the diameter d of the measuring sphere 30 is determined by the inside diameter (minimum diameter in the case where the inside diameter is not fixed) D of the hole 22A to be measured and the required sensitivity. For example, the diameter d is determined so that a difference (D−d) between D and d is about 10 μm to 100 μm. As the difference (D−d) between D and d decreases, the sensitivity becomes higher, so that even if the inside diameter D of the hole 22A changes a little, the detected value of the A/E converter 18 changes greatly.

Also, as shown in FIG. 1, the measuring sphere 30 is installed to an arm 36 via a support member 32 formed of an elastic body (for example, a piano wire). The arm 36 is slidably mounted on a frame 40 via sliders 38, 38, and a feed screw 44 connected to the rotating shaft of a motor 42 is threadedly mounted in the arm 36. Thereupon, when the motor 42 is driven, the feed screw 44 turns, so that the arm 36 moves up and down.

Above the arm 36 is provided a linear scale 46. The linear scale 46 detects the vertical displacement of the arm 36, and sends the detection signal to the controller 20. The controller 20 controls the drive of the motor 42 based on this detection signal, and thereby regulates the vertical displacement of the arm 36, that is, the vertical position of the workpiece 22.

The following is a description of the operation of the measuring apparatus 10 constructed as described above.

First, compressed air is supplied from the air source 12, and is injected into the hole 22A through the supply port 28A of the measurement bed 28. Next, the motor 42 is driven to lower the arm 36 at a constant speed, by which the measuring sphere is inserted into the hole 22A, and the inserted measuring sphere 30 is lowered along the hole 22A. At this time, the back pressure created when the compressed air passes through the gap between the measuring sphere 30 and the inside wall of the hole 22A is detected at a plurality of locations at predetermined intervals (or continuously). Since the back pressure depends on the width of gap between the measuring sphere 30 and the inside wall of the hole 22A, the detected value of back pressure can be converted into the inside diameter of the hole 22A by comparing the detected value with the master reference value by using the controller 20. Thereby, the inside diameter of the hole 22A can be measured at a plurality of locations, so that the shape of the hole 22A can be determined. In this description, the master reference value means a value obtained by measuring a master standard under the same conditions as those at the time of measurement prior to the measurement. The master reference value is determined each time the measurement conditions are changed.

At the time of measurement, the measuring sphere 30 is subjected to automatic centripetal action (or automatic aligning action) by the compressed air passing through the gap between the inside wall of the hole 22 A and the measuring sphere 30. Therefore, the support member 32 is deformed elastically so that the measuring sphere 30 is automatically disposed at the center of the hole 22A. Thereupon, the compressed air passes through a gap formed almost uniformly around the workpiece 22, so that the inside diameter of the workpiece 22 can be measured with high accuracy by detecting the back pressure at this time.

Figure 7:
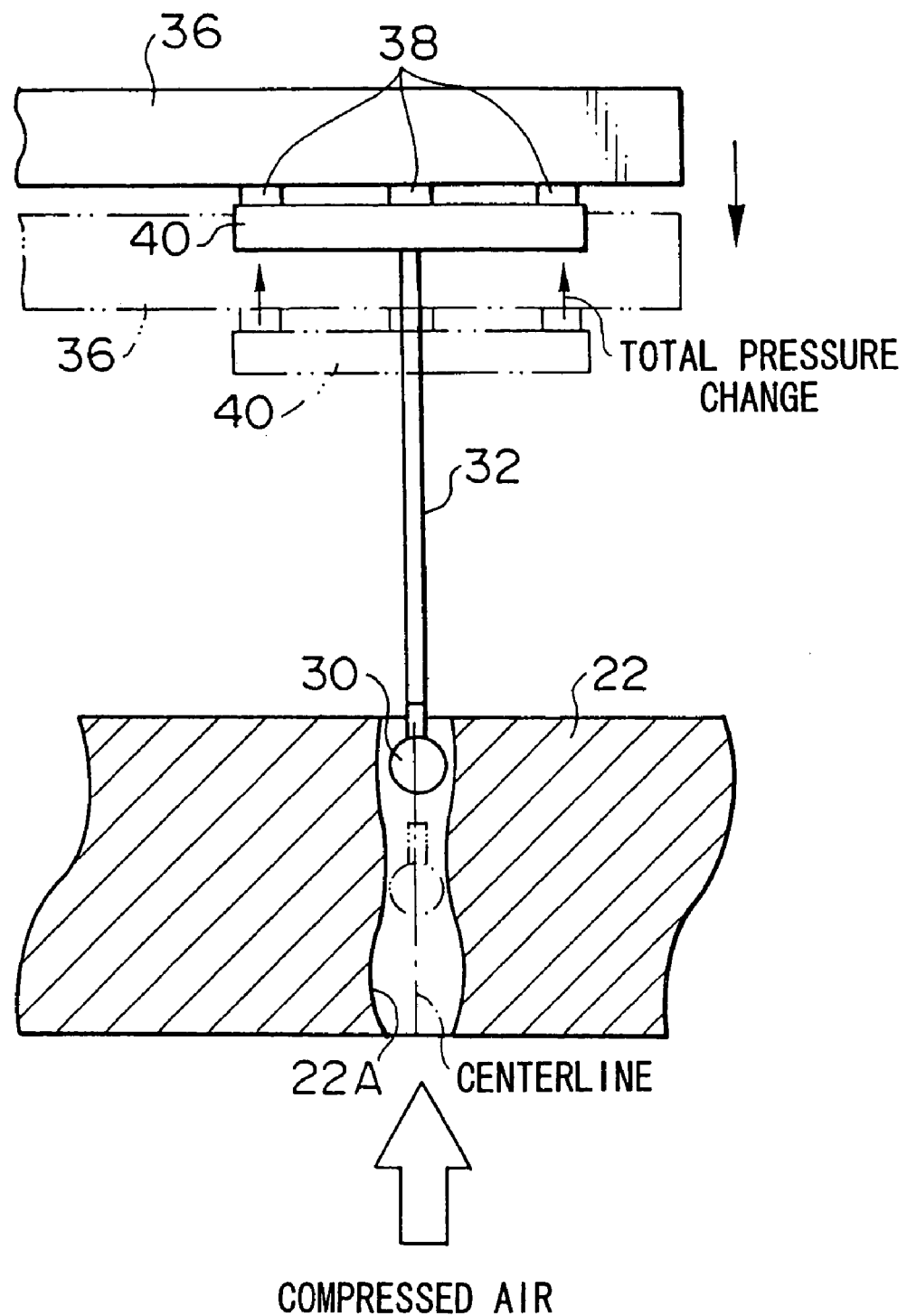
FIG. 7 is an explanatory view showing the operation of the hole shape measuring apparatus shown in FIG. 3.

As described above, according to the measuring apparatus 10 of this embodiment, the back pressure is measured at a plurality of locations while the measuring sphere 30 is moved along the hole 22A, so that the inside diameter of the hole 22A can be determined at a plurality of locations at predetermined intervals in the depth direction of the hole 22A. Therefore, the shape of the hole 22A can be obtained, and also the shape of the hole 22A having an unfixed diameter can be determined. For example, in the case where a taper is formed in the hole 22A, the angle of the taper can be determined. Even in the case where the hole 22A has a decreased diameter portion or an increased diameter portion as shown in FIG. 7, the shape of the decreased diameter portion or the increased diameter portion can also be determined. Further, the measuring apparatus 10 can check whether or not the diameter of the hole 22A is fixed.

Although the arm 36 is lowered at a constant speed in the above-described embodiment, the arm 36 may be lowered at a variable speed. In this case, the position of the measuring sphere 30 is detected by the linear scale 46 at the same time the back pressure is detected by the A/E converter. Thereby, the measurement of the inside diameter of the hole 22A and the recording of the measurement position can be accomplished at the same time. Thus, the shape of the hole 22A can be determined.

Also, although the back pressure of compressed air is detected in the above-described embodiment, the configuration is not limited to this. The flow rate of compressed air at the time when the compressed air passes through the gap between the inside wall of the hole 22A and the measuring sphere 30 may be detected. In this case as well, as in the case of the above-described embodiment, the controller 20 compares the detected value with the master reference value, by which the inside diameter of the hole 22A can be measured with high accuracy.

Further, the present invention is not limited to the detection of back pressure and flow rate of compressed air, and the configuration may be such that the drag which the measuring sphere 30 is subjected to is detected by using a piezoelectric pickup or a strain gage, and the detected value is converted into the inside diameter of the hole 22A.

Figure 3:
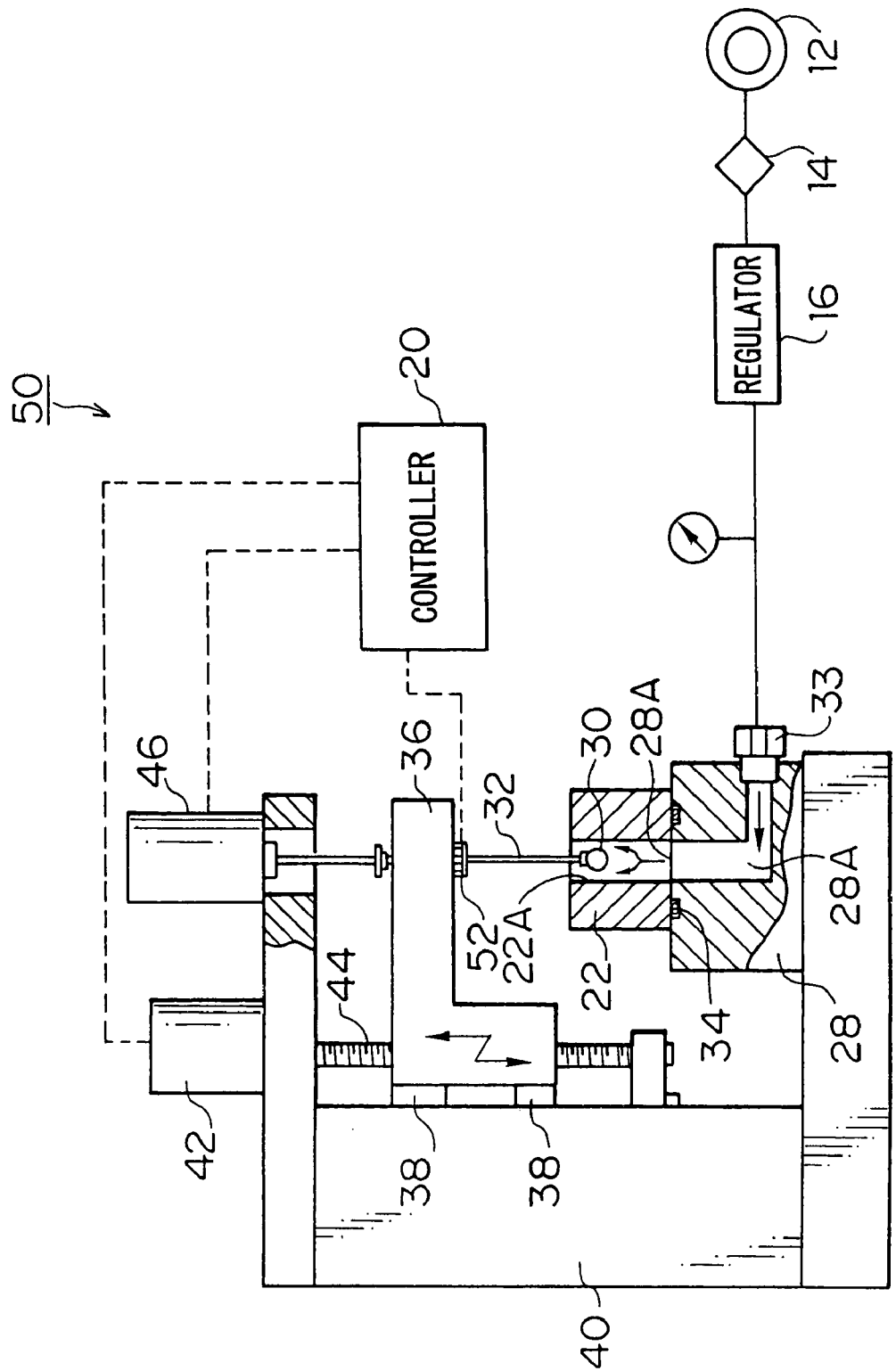
FIG. 3 is a block diagram showing a construction of a second embodiment of a hole shape measuring apparatus in accordance with the present invention.
Figure 4:
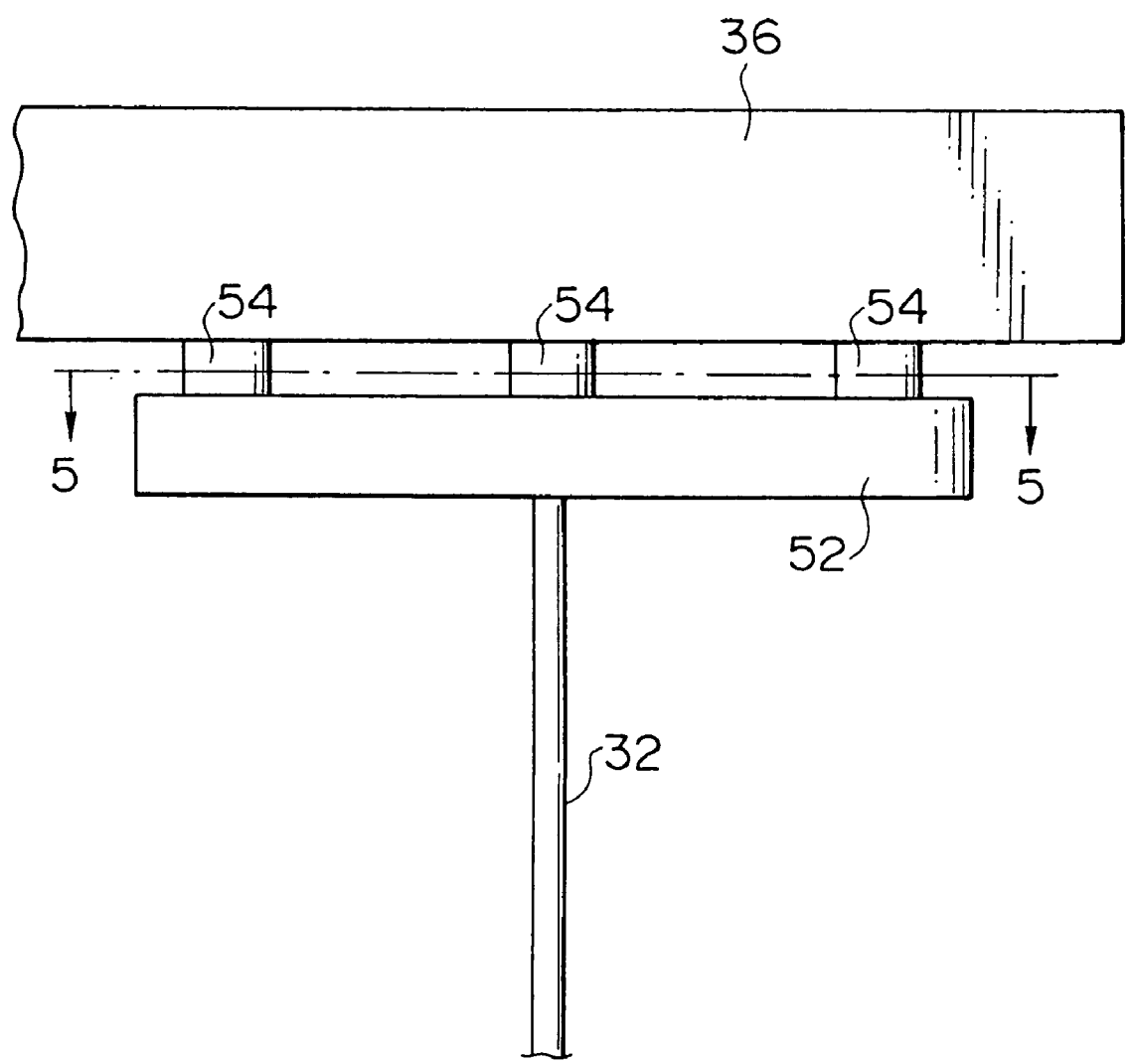
FIG. 4 is a side view showing a characteristic portion of the hole shape measuring apparatus shown in FIG. 3.

FIG. 3 is a block diagram showing a construction of a measuring apparatus 50 in accordance with a second embodiment, and FIG. 4 is a side view of a connecting mechanism between the arm 36 and the support member 32. The measuring apparatus 50 shown in FIGS. 3 and 4 is an apparatus that measures the centerline of the hole 22A.

Figure 5:
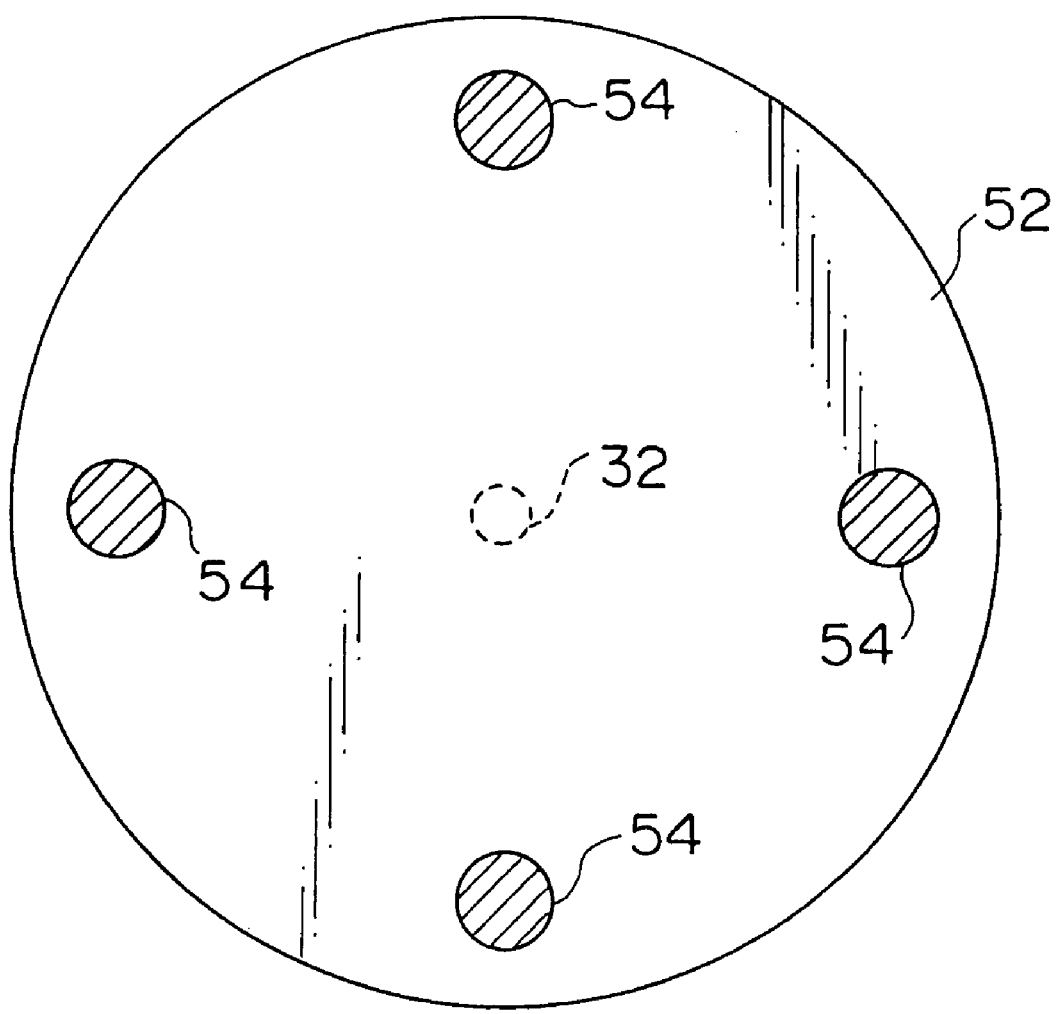
FIG. 5 is a sectional view taken along the line 5—5 of FIG. 4.

In the measuring apparatus 50, a disk 52 is installed at the upper end of the support member 32, and is connected to the arm 36 via four piezoelectric sensors 54, 54, . . . As shown in FIG. 5, the support member 32 is connected to the center of the disk 52, and the piezoelectric sensors 54, 54, . . . are disposed at predetermined intervals in the peripheral portion of the disk 52. Each of the piezoelectric sensors 54 detects the drag which the measuring sphere 30 is subjected to, which is divided into four directions, and sends the detection signal to the controller 20. On receipt of the detection signal from each of the piezoelectric sensors 54, the controller 20 calculates a rotation moment from a difference in detected value. Then, the position of the measuring sphere 30 is determined from this rotation moment and the vertical displacement of the arm 36 detected by the linear scale 46.

Figure 6:
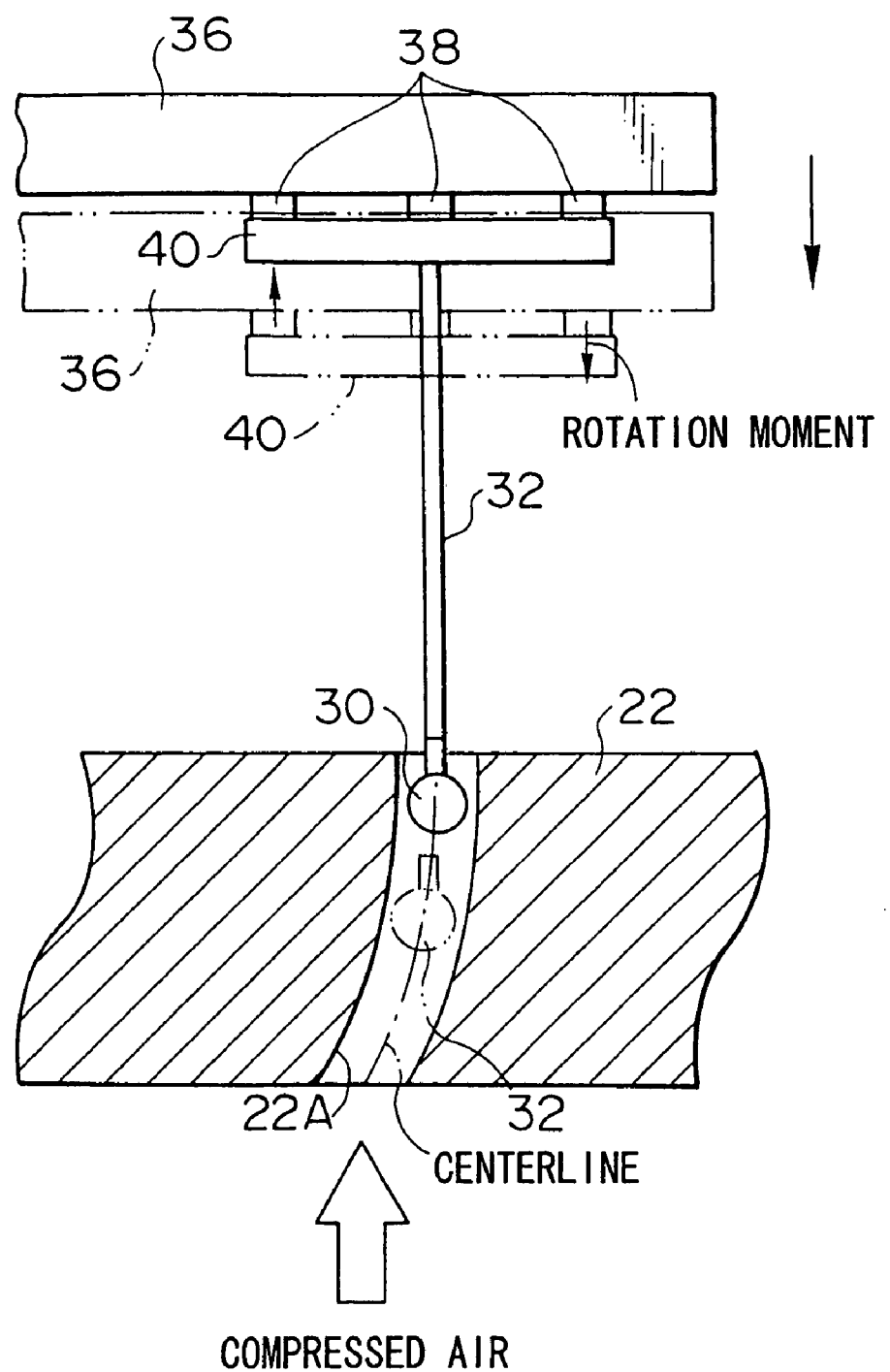
FIG. 6 is an explanatory view showing the operation of the hole shape measuring apparatus shown in FIG. 3.

In the measuring apparatus 50 constructed as described above, the measuring sphere 30 is inserted into the hole 22A into which compressed air is supplied, and the position of the measuring sphere 30 is detected at a plurality of locations at predetermined intervals (or continuously) while the measuring sphere 30 is moved in the depth direction of the hole 22A. At the time of measurement, the measuring sphere 30 is automatically moved to the center of the hole 22A by the automatic centripetal action. Therefore, when the measuring sphere 30 is lowered along the hole 22A, the path of the center of the measuring sphere 30 coincides with the centerline of the hole 22A. For example, in the case where the hole 22A is formed so as to be curved as shown in FIG. 6, the measuring sphere 30 moves along the centerline of the hole 22A, which is indicated by a dash-and-dot line. Therefore, the rotation moment is calculated by the detected values of piezoelectric sensors 38, 38 . . . , and the path of the center of the measuring sphere 30 is determined, by which the centerline of the hole 22A can be determined. Thereby, the curvature etc. of the hole 22A can be measured. Similarly, in the case where the hole 22A is bent, the bend angle can be determined. Also, in the case where the hole 22A is formed slantwise, the angle of the hole 22A can be determined.

As described above, according to the measuring apparatus 50, by detecting the drag at a plurality of locations by the piezoelectric sensors 54, 54 . . . while the measuring sphere 30 is moved along the hole 22A, the position of the center of the hole 22A can be measured at a plurality of locations, and thereby the centerline of the hole 22A can be determined.

The measuring apparatus 50 can calculate the total drag which the measuring sphere 30 is subjected to by summing up the detected values of the piezoelectric sensors 54, 54 . . . . Therefore, by comparing the calculated value with the master reference value, the inside diameter of the hole 22A can be determined as in the first embodiment. For example, in the case where the hole 22A has a decreased diameter portion or an increased diameter portion as shown in FIG. 7, by determining the inside diameter of the hole 22A at a plurality of locations, the shape of the decreased diameter portion or the increased diameter portion can also be determined.

Figure 8:
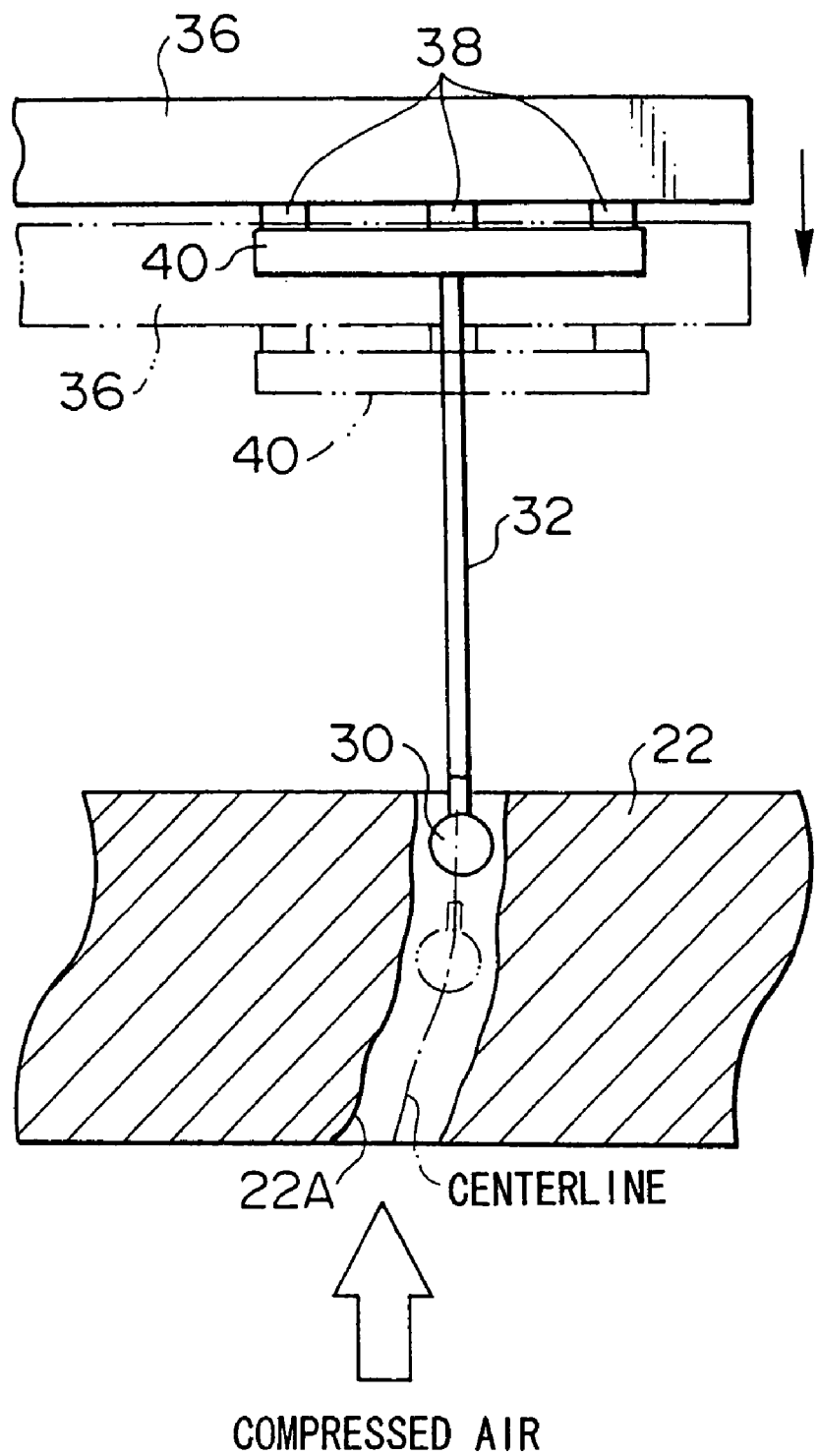
FIG. 8 is an explanatory view showing the operation of the hole shape measuring apparatus shown in FIG. 3.

Further, the measuring apparatus 50 can determine the position of the center of the measuring sphere 30 and the inside diameter of the hole 22A at the same time from the detected value of each of the piezoelectric sensors 54, 54 . . . . Therefore, even in the case where the hole 22A has an intricate shape (that is, in the case where the centerline of the hole 22A is nonlinear, and the diameter thereof is unfixed), the shape of the hole 22A can be determined. For example, in the case where the hole 22A is formed as shown in FIG. 8, when the measuring sphere 30 is moved in the depth direction of the hole 22A, the measuring sphere 30 moves along the centerline of the hole 22A, which is indicated by a dash-and-dot line. At this time, the drag and rotation moment which the measuring sphere 30 is subjected to are calculated from the detected values of the piezoelectric sensors 54, 54 . . . , by which the inside diameter and the position of the center of the hole 22A is determined. By determining the inside diameter and the position of the center of the hole 22A at a plurality of locations, the shape of the hole 22A can be obtained specifically. Since the measuring apparatus 50 can determine the position of the center and the inside diameter of the hole 22A at a plurality of locations, it can determine the shape of various holes.

Although four piezoelectric sensors 54, 54 . . . are provided to determine the rotation moment in the above-described embodiment, three or more piezoelectric sensors may be provided. Also, in place of the piezoelectric sensor 54, a load cell may be used.

Figure 9:
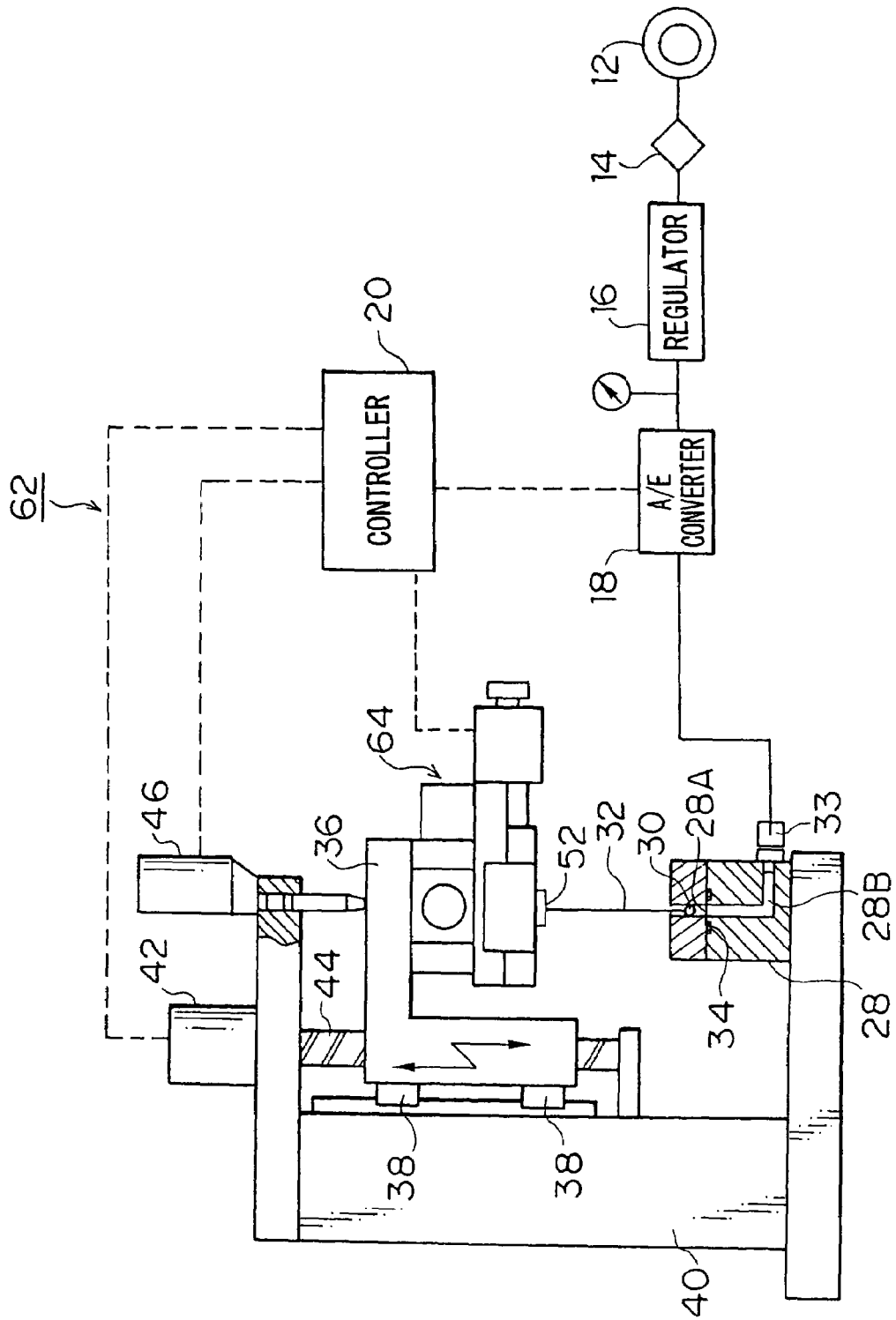
FIG. 9 is a block diagram showing a construction of a third embodiment of a hole shape measuring apparatus in accordance with the present invention.

FIG. 9 is a block diagram showing a construction of a measuring apparatus 62 in accordance with a third embodiment.

In the measuring apparatus 62 shown in FIG. 9, the disk 52 at the upper end of the support member 32 is installed to an XY-axes stage 64 via three or more piezoelectric elements (not shown), and the XY-axes stage 64 is installed to the arm 36. The XY-axes stage 64 supports the disk 52 so that the disk 52 is slidable in the horizontal direction, and detects the position of the disk 52 by means of incorporated sensors (not shown).

The measuring apparatus 62 constructed as described above adjusts the position of the disk 52 by using the XY-axes stage 64 until the detected values of each piezoelectric elements become equal. Thereupon, the direction of the drag which the measuring sphere 30 is subjected to coincides with the axial direction of the hole 22A. Therefore, by detecting the position of the disk 52 by using the sensors incorporated in the XY-axes stage 64, the position of the center of the measuring sphere 30 is determined, so that the centerline of the hole 22A can be determined.

In the above-described third embodiment, the configuration may be such that the support member 32 is formed of a rigid body, and the support member 32 is connected directly to the XY-axes stage 64. In this case, the position of the upper end of the support member 32 changes according to the position of the measuring sphere 30, so that the position of the measuring sphere 30 can be detected by the sensors incorporated in the XY-axes stage 64.

Figure 10:
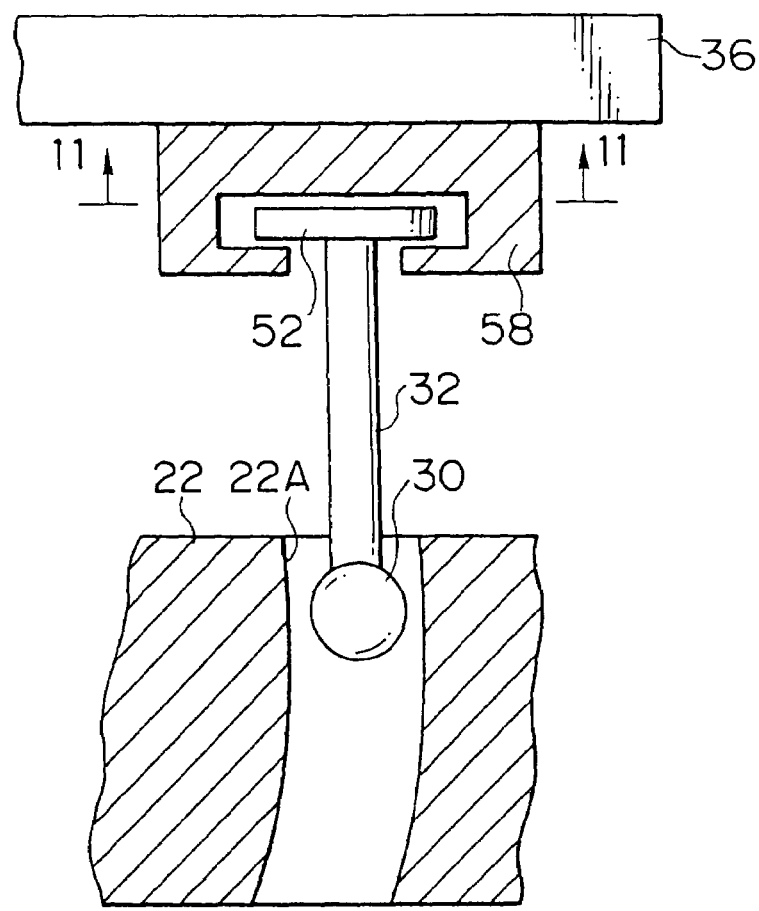
FIG. 10 is a side view showing a measuring sphere support structure different from that shown in FIG. 9.
Figure 11:
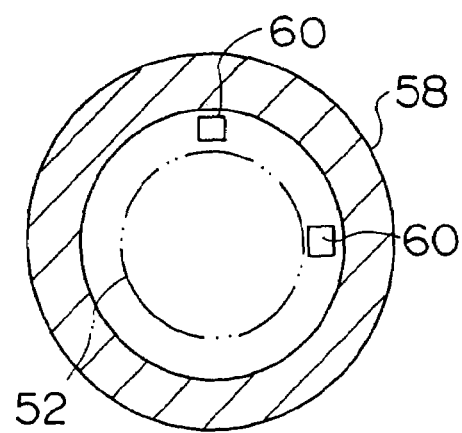
FIG. 11 is a sectional view taken along the line 11—11 of FIG. 10.

Also, as shown in FIG. 10, the support member 32 may be installed to the arm 36 by using a floating mechanism. The support member 32 shown in FIG. 10 is formed of a rigid body, and the disk 52 is mounted at the upper end of the support member 32. The disk 52 is supported by a hydrostatic bearing 58 so as to be slidable in the horizontal direction. As shown in FIG. 11, the hydrostatic bearing 58 is provided with position detecting sensors 60, 60 such as optical encoders or magnetic scales so that the position of the disk 52, that is, the position of the measuring sphere 30 on the horizontal plane is detected by the position detecting sensors 60. The position of the measuring sphere 30 is calculated based on the position of the measuring sphere 30 on the horizontal plane, which is detected by the position detecting sensors 60, and the vertical position of the measuring sphere 30, which is detected by the linear scale 46. Thereby, when the measuring sphere 30 is caused to pass through the hole 22A, the path of the center of the measuring sphere 30 can be determined, and thereby the centerline of the hole 22A can be determined.

Although the measuring sphere 30 is moved against the flow of compressed air in the above-described first to third embodiments, the configuration is not limited to this, and measurement may be made while the measuring sphere 30 is moved in the direction in which the compressed air flows.

Also, the fluid supplied into the hole 22A is not limited to compressed air, and a gas other than air or a liquid may be supplied into the hole 22A.

Also, there may be provided a temperature control device which controls the temperature of fluid supplied into the hole 22A.

INDUSTRIAL APPLICABILITY

As described above, according to the method and apparatus for measuring a hole shape according to the present invention, a float is moved along the depth direction of hole into which a fluid is supplied, and the position of the float and the inside diameter of the hole are detected at a plurality of locations. Therefore, the shape of various holes can be measured.

The invention claimed is:

1. A hole shape measuring method for measuring a centerline of a hole to obtain a shape of said hole, comprising the steps of:
   supplying a fluid into said hole;
   inserting a float into said hole;
   detecting a position of said float at a plurality of locations while said float is moved in a depth direction of said hole;
   determining tho centerline of said hole from the detected value; and
   obtaining the shape of said hole based on said centerline.

2. A hole shape measuring apparatus for measuring a centerline of a hole to obtain a shape of said hole, comprising:
   a fluid supply device which supplies a fluid into said hole;
   a float inserted in said hole;
   a moving device which moves said float in a depth direction of said hole;
   a position detecting device which detects positions of said float at a plurality of locations;
   a position detecting sensor which detects positions of said float at plurality of locations in a horizontal direction; and
   a linear scale which detects positions of said float at a plurality of locations in a vertical direction.

3. The hole shape measuring apparatus according to claim 2, wherein said float is supported by an elastic body.

4. A hole shape measuring apparatus for measuring a centerline of a hole to obtain a shape of said hole, comprising:
   a fluid supply device which supplies a fluid into said hole;
   a float inserted in said hole;
   a moving device which moves said float in a depth direction of said hole; and
   a position detecting device which detects position of said float at a plurality of locations, wherein said position detecting device detects the drag which said float is subjected to by being divided into three or more directions.

5. The hole shape measuring apparatus according to claim 4, wherein said float is supported by an elastic body.

6. A hole shape measuring method for measuring inside diameters of a hole at a plurality of locations in a depth direction of said hole and also for measuring a centerline of said hole to obtain a shape of said hole, comprising the steps of:
   supplying a fluid into said hole;
   inserting a float into said hole;
   detecting, at a plurality of locations, at least one of a back pressure and a flow rate at the time when said fluid passes through a gap between the inside wall of said hole and said float and a drag which said float is subjected to while said float is moved in the depth direction of said hole, and positions of said float;
   comparing at least one of the detected value of said back pressure, flow rate, and said drag which said float is subjected to with a reference value to convert said detected value into an inside diameter of said hole;
   determining the centerline of said hole from the detected value of the position of said float; and
   obtaining the shape of said hole based on the centerline of said hole and the inside diameter of said hole.

7. A hole shape measuring apparatus for measuring inside diameters of a bole at a plurality of locations in a depth direction of said hole and also for measuring a centerline of said hole to obtain a shape of said hole, comprising:
   a fluid supply device which supplies a fluid into said hole;
   a float inserted in said hole;
   a moving device which moves said float in the depth direction of said hole;
   a detecting device which detects, at a plurality of locations, at least one of a back pressure and a flow rate at the time when said fluid passes through a gap between the inside wall of said hale and said float and a drag which said float is subjected to;
   a converting device which converts the detected value obtained by said detecting device into an inside diameter of said hole by comparing said detected value with a reference value; and
   a position detecting device which detects positions of said float at a plurality of locations.

8. The hole shape measuring apparatus according to claim 7, wherein said float is supported by an elastic body.

9. The hole shape measuring apparatus according to claim 7, wherein said position detecting device detects the drag which said float is subjected to by being divided into three or more directions.

10. The hole shape measuring apparatus according to claim 9, wherein said float is supported by an elastic body.

* * * * *